Figure 1:
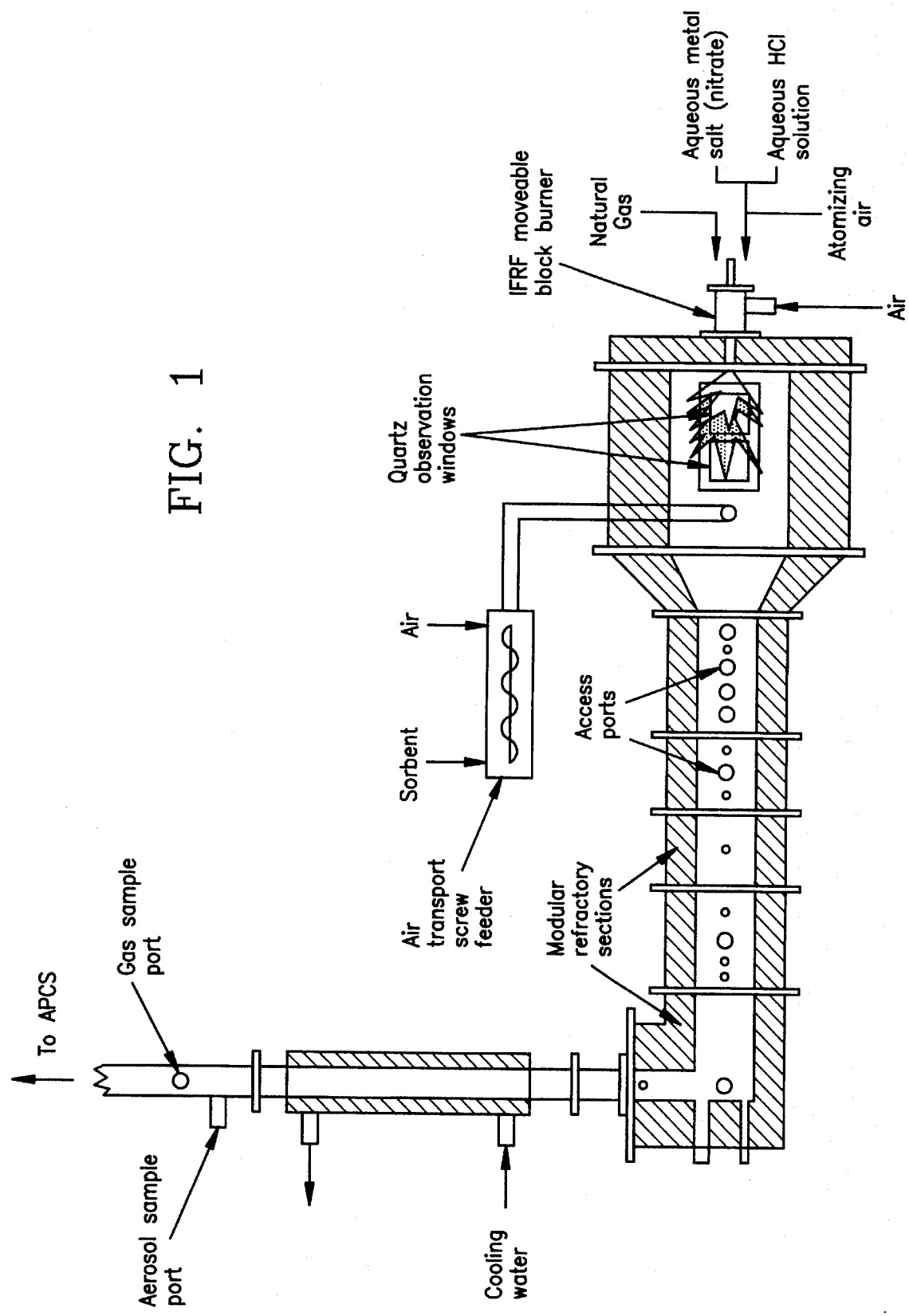

United States Patent [19]
Linak et al.

[11] Patent Number: 5,619,937
[45] Date of Patent: Apr. 15, 1997

[54] SORBENT MELTS FOR CAPTURE OF METALS FROM COMBUSTION GASES

[75] Inventors: William P. Linak, Research Triangle Park, N.C.; Ravi K. Srivastava, Washington, D.C.; Jost O. L. Wendt, Tucson, Ariz.

[73] Assignee: The United States of America as represented by the Administrator of the U.S. Environmental Protection Agency, Washington, D.C.

[21] Appl. No.: 352,119

[22] Filed: Dec. 1, 1994

[51] Int. Cl.$^6$ ........................................... F23J 11/00
[52] U.S. Cl. ........................................ 110/345; 423/103
[58] Field of Search .................... 110/203, 215, 110/301, 345, 342; 423/242.2, 244.07, 244.05, 247, 103

[56] References Cited

U.S. PATENT DOCUMENTS 4,620,492 11/1986 Vogg et al. ............................ 110/345
5,092,254 3/1992 Kubin et al. ............................ 110/233

OTHER PUBLICATIONS

Hazardous Waste Incineration: The In–Situ Capture of Lead by Sorbents in a Laboratory Down–Flow Combustor, 24th Symposium (International) on Combustion/The Combustion Institute, 1992, pp. 1100–1117 SCOTTO et al.
High–Temperature Removal of Cadmium Compounds Using Solid Sorbents Environ. Sci. Technol. 1991, 25, 1285–1289, UBEROL et al.
Sorbents for Removal of Lead Compounds from Hot Flue Gases, AIChE Journal Feb. 1990, vol. 36, No. 2, pp. 307–309.
Metal Capture During Fluidized Bed Incineration of Wastes Contaminated with Lead Chloride; Accepted for publication by the Journal of Combustion Science & Technology; Lamar University, Department of Chemical Engineering; Jun. 26, 1991.
Sorbent Capture of Nickel, Lead, and Cadmium in a Laboratory Swirl Flame Incinerator; Prepared for oral presentation and Proceedings publication at the 25th International Symposium on Combustion, Irvine, CA Jul. 31–Aug. 5, 1994, revised Dec. 6, 1993, LINAK et al.
Metal Aerosol Formation in a Laboratory Swirl Flame Incinerator; Prepared for presentation at the 3rd International Congress on Toxic Combustion Byproducts and publication in Combustion Science & Technology submitted Jun. 8, 1993,LINAK et al.
Toxic Metal Emissions From Incineration: Mechanisms and Control Prog. Energy Combust. Sci. 1993, vol. 19, pp. 145–185, LINAK et al.

Primary Examiner—Henry A. Bennett
Assistant Examiner—Susanne C. Tinker
Attorney, Agent, or Firm—Lorusso & Loud

[57] ABSTRACT

A cloud or dispersion of a particulate flux is formed in a combustion zone for the purpose of capturing metallic vapor from the combustion gas by formation of a eutectic of the metal and the flux, as a melt on at least the surfaces of the dispersed flux particles. The flux particles are heated within the combustion zone to a temperature sufficient to form the eutectic melt. The preferred flux particles utilized in the invention include conventional metallurgical fluxes, e.g. calcium carbonate, sodium carbonate and magnesium carbonate.

18 Claims, 5 Drawing Sheets

SORBENT MELTS FOR CAPTURE OF METALS FROM COMBUSTION GASES

BACKGROUND

1. Field of the Invention

The present invention relates to the removal of metal vapor and submicron metal particles from combustion off-gas.

2. The Prior Art

Emissions of toxic metals, specifically, Cd, Pb, Hg, Ni, Sb, As, Ba, Be, Cr, Co, Mn, Se, Ag and Tl, into the air are regulated in the U.S. by the Resource Conservation and Recovery Act ("RCRA") and by the Clean Air Act.

Many wastes contain toxic metal constituents. Often, when these metals are associated with organic and aqueous components, incineration may be the preferred method of waste treatment and disposal. Incineration technologies can be effective in reducing waste volume and destroying organic elements. However, incineration cannot destroy the elemental metal constituents, although high temperature combustion environments will induce metal transformations. These transformations are usually thought to exacerbate their harmful effects, since many of the metal species formed readily vaporize within combustion environments, which vapor will nucleate and condense downstream of the flame, forming a fume of submicron aerosol. These particles, because of their small size, are difficult to collect in pollution control systems. Moreover, combustion gas in such incinerators often contains significant amounts of chlorine as $Cl_2$ and/or chloride compounds, the presence of which inhibits capture and removal of the metals. Chlorinated metal species that are collected often exhibit increased water leachability.

Using a downflow laboratory combustor, Scotto et al found that lead could be reactively scavenged in-situ by kaolinite powder which was injected into the postflame. See Scotto, M. V. Peterson, T. W., and Wendt, J.O.L. Twenty-Fourth Symposium (International) on Combustion, The Combustion Institute, Pittsburgh, 1992, pp. 1109–1117. Reactive scavenging (chemisorption) of a metal occurs at temperatures above the metal vapor dewpoint. Scotto et al also found that, although 99% of the lead could be captured by kaolinite, by reaction forming a lead aluminosilicate, the process was inhibited by the presence of chlorine.

Uberoi and Shadman investigated the use of kaolinite, bauxite, and limestone as sorbents to capture lead and cadmium. Their subcombustion temperature, fixed bed experiments, suggested that crystalline kaolinite might be somewhat less effective than crystalline bauxite in capturing cadmium because of pore closure observed in the cadmium/kaolinite system but not in the cadmium/bauxite system. For the lead/kaolinite system, the formation of a melt on the kaolinite surface appeared to enhance lead capture as lead aluminosilicate. Presence of a melt was also noted in the above-mentioned experiments of Scotto et al. Uberoi and Shadman also found that limestone was not an effective sorbent for either cadmium or lead.

Thus, previous research in this area has focused on the reaction of toxic metals and crystalline sorbents to form stable reaction products. Additionally, previous work has focused on low temperature applications such as those conditions common to flue gas cleaning environments. This has the disadvantage of limiting application to metal/sorbent systems where stable reaction products exist and limiting kinetic rates due to low temperatures. Previous research has been concerned not to expose sorbents to combustor conditions which would sinter or close pores and reduce effective surface area. One mechanism involves reaction between metal vapor and a sorbent crystalline surface, as in the reaction between cadmium and bauxite. Here, large pores prevent pore plugging by reaction products. This mechanism was identified by Uberoi and Shadman. See Uberoi, M., and Shadman, F., AIChE Journal, 36(2):307–309 (1990) and Uberoi, M., and Shadman, F., Environ. Sci. Technol., 25(7):1285–1289 (1991). However, metal sorption on crystalline sorbent surfaces is diminished when pores are plugged, as with cadmium/kaolinite, at moderately high temperatures.

Kubin et al—U.S. Pat. No. 5,092,254 discloses the injection of calcium based sorbents into a combustor for control of acid gases. In this process, great care is taken to avoid sorbent melting, in order to allow acid gas capture to take place. The reaction which is exploited in this process is one between acid gas constituents and crystalline surfaces, contained within a solid particle.

SUMMARY OF THE INVENTION

Accordingly, one object of the present invention is to exploit the high temperatures within conventional incinerators to transform potentially toxic metals into constituents that are both more easily collected and more environmentally benign than metal effluents.

Another objective is to provide for the foregoing without need for combustion modification.

Yet another objective is to provide a process for the effective removal of metal vapor from combustion gas even in the presence of a significant amount of chlorine.

To achieve the foregoing objectives, the present invention provides a process for the removal of vapor phase metal from a combustion gas. The process of the present invention involves contacting the combustion gas with a particulate fluxing agent heated to a temperature sufficient to form eutectic surface melt, the captured metal forming one component of the eutectic melt and the fluxing agent itself forming a second component of the eutectic melt. Optionally, another metal can be added to form a third component of the eutectic melt.

A preferred mode for contacting the combustion gas with the particulate fluxing agent is by introduction of the particulate flux into a combustion zone, containing the combustion gas, to form a suspension or "cloud" of the particulate flux within the combustion zone and thereby bring the particulate flux into contact with the vapor phase metal contained in the combustion gas. The "flux" or "fluxing agent" used in the present invention may be any flux conventionally used in metallurgy. Suitable fluxing agents include, but are not limited to, calcium carbonate, sodium carbonate, magnesium carbonate, hydrated lime, etc.

The preferred flux is at least one member selected from a group including calcium oxide, calcium hydroxide and calcium substances which are converted to calcium oxide and/or calcium hydroxide in the combustion zone. Almost any calcium containing compound will form the oxide or hydroxide in the combustion zone, e.g. calcium sulfate and calcium salts of organic acids.

Preferably, the particulate fluxing agent is injected into a location within the combustion zone where the temperature is sufficient to form a melt of a eutectic of the fluxing agent and at least one of the vapor phase metals on at least surface portions of the fluxing agent particles, thereby capturing the vapor phase metal in the eutectic melt. In the preferred approach, the injected particulate fluxing agent forms a gaseous suspension or cloud. However, other modes of contact, including use of a fixed or fluidized bed, may be feasible, particularly if the fluxing agent is admixed with non-fusible particles or adhered to a non-fusible support.

Metals which may be removed from vapor phase in accordance with the present invention include all of the previously mentioned "toxic metals" and, in particular, nickel, lead, cadmium and mercury.

In one aspect, the present invention involves the discovery that hydrated lime, for example, acts at a high temperature as an effective agent to scavenge cadmium which would otherwise contribute to the submicron aerosol fraction. These results are in contrast to those of Uberoi and Shadman. The present inventors have found, for example, that in the absence of cadmium, the lime particles remained crystalline, angular, and did not melt at the temperatures employed in their experiments. However, at the same temperatures and with the addition of cadmium, the calcium rich particles melted, forming a eutectic with the cadmium.

The process of the present invention differs from the prior art in that the metal vapor of the combustion gas is captured as one component of a eutectic surface melt on the fluxing agent particle rather than internally within the pores of a crystalline alumino-silicate sorbent or as a reaction product of the metal and the sorbent, e.g. lead alumino-silicate as in the work reported by Scotto et al. The eutectics employed in the present invention are physical admixtures, i.e. solutions, not products of a chemical reaction between a vapor phase metal and the fluxing agent.

The process of the present invention also differs from the prior art in terms of the affect of particle size. The efficacy of the prior art approaches is highly dependent upon sorbent surface area, with the rate of reaction being proportional to $1/d_p$, $d_p$ being the sorbent particle average diameter. In contradistinction, the efficiency of the process of the present invention appears to be fairly independent of particle size.

In general the prior art approach has been to promote the formation of crystalline stable metal/sorbent chemical reaction products. This necessitates that the sorbent not be subjected to conditions which would damage its pore structure or reduce its effective surface area. In contradistinction, this invention seeks to promote flux particle melting through injection into high temperature combustor locations and to thereby form metal/flux eutectic melts. These melts may be comprised of metals and a flux which would not form stable reaction products (cadmium and lime, for example). This has the advantage of expanding the utilization of the fluxing agent or "sorbent" to a larger set of toxic metals.

Yet another distinguishing characteristic of the present invention is that, in contrast to the findings of Scotto et al, the process is not adversely affected by the presence of significant amounts of chlorine in the combustion gas. In point of fact, the presence of chlorine in the process of the present invention actually enhances the capture of certain "non-volatile" metals such as nickel. This is an important advantage of the present invention because incinerator combustion gas typically contains significant amounts of chlorine.

The process of the present invention also differs from that of Kubin et al in its production of a melt on the particle surface. This melt solubilizes toxic metals but not acid gases. Therefore, were this melt to be formed during the process described in U.S. Pat. No. 5,092,254, acid gas capture would not occur and the process would have no value, as far as the objective of Kubin et al, i.e. acid gas capture, is concerned.

BRIEF DESCRIPTION OF THE DRAWINGS

FIG. 1 is a schematic illustration of a horizontal tunnel combustor as used in the examples described below;

FIG. 2 is a schematic illustration of a burner element as used in the combustor of FIG. 1;

FIGS. 3A and 3B are graphs showing experimental results for a nickel/kaolinite/chlorine system;

FIGS. 4A and 4B are graphs showing experimental results for a lead/kaolinite/chlorine system; and FIGS. 5A and 5B are graphs showing data for a cadmium, kaolinite, kaolinite/chlorine system.

DESCRIPTION OF THE PREFERRED EMBODIMENTS

The terms "fluxing agent" and "flux", as used herein, define any material which will form, at least on its surface, a eutectic melt in combination with one or more of the metals to be removed from the combustion gas. The "fluxing agent" or "flux" utilized in the present invention might also be characterized as a "sorbent" in the sense that it dissolves or absorbs metals from the gaseous phase into a eutectic melt. The terms "eutectic" and "eutectic melt" as used herein have reference to a physical admixture of the fluxing agent and at least one metal derived from the combustion gas and are thereby distinguished from a product of a chemical reaction between the fluxing agent and the metal component or components. The "eutectic melt" of the present invention can also be characterized as a solution of the captured metal in the liquified flux. The "eutectic" utilized in the present invention will invariably have a melting point lower than that of the fluxing agent alone. It is contemplated that most, if not all, fluxing agents used in conventional metallurgical practices are suitable for use in the present invention.

The effect of the present invention has been observed at measured temperatures as low as 1500° Kelvin. However, certain eutectics within the scope of the present invention may have melting points as low as about 1000° K. Accordingly, the operating temperature will be at least 1000° K. In general, a sorbent temperature range of about 1000° K to 2000° K is contemplated. However, the important aspect of temperature in the context of this invention is that the temperature be sufficient to form a eutectic melt of the fluxing agent with one or more metals present in the combustion gas, at least to the extent of forming the eutectic melt as a surface melt on the particle surfaces.

As noted above, particle size plays little or no part in the present invention. This was confirmed experimentally in the experiments described below. In the experiment reported below employing hydrated lime, which is within the scope of the invention, the mass mean diameter of the particulate hydrated lime was 2.24 microns.

The fluxing agent can be injected into the combustion zone in any conventional manner, for example, using the air transport screw feeder employed in the experiments described below. As noted above, it may be feasible to contact the combustion gas with the fluxing agent in the form of a packed bed, in the form of a fluidized bed or in the form of a coating on a monolithic, non-fusible support, e.g. a ceramic honeycomb.

Optionally, at least a third metal may be added in order to further depress the melting point of the eutectic. Suitable metals include, but are not limited to, the alkaline earth metals (the elements of Periodic Group IIA—Be, Mg, Ca, Sr, Ba and Ra), the alkali metals (the elements of Periodic Group IA—Li, Na, K, Rb, Cs and Fr), boron and iron (FeO). One or more of these additional metals may be introduced into the eutectic melt by adding the metal or metals and/or a compound or compounds thereof to the combustion system. For example, a compound or compounds of one or more of these metals may be used to impregnate the fluxing agent. A compound or compounds of the additional metals may, in the alternative, be introduced into the combustion zone in the form of powder particles separate and apart from the fluxing agent particles or may be added to the material undergoing incineration. The type of compound containing such metals is technically of little importance in the context of the present invention so long as it forms a eutectic with the fluxing agent melt as is or yields a component, e.g. the elemental metal, for dissolution in the eutectic, at the temperature employed in the process, of the additional metal or metals to be added to the eutectic. For example, almost any calcium containing substance can be used as the fluxing agent in view of the fact that most calcium containing substances are converted into either lime or calcium hydroxide at the high temperatures of the combustion zone.

EXAMPLES

The experiments of the examples reported below were performed using a semi-industrial scale 82 kW (280,000 Btu/hr) horizontal tunnel combustor as shown in FIG. 1. This refractory-lined research combustor was designed to simulate the time/temperature and mixing characteristics of practical industrial liquid and gas waste incineration systems. Fuel, surrogate wastes, and combustion air were introduced into the burner section through an International Flame Research Foundation (IFRF) moveable-block variable air swirl burner. This burner, incorporates an interchangeable injector shown in FIGS. 2(a) and 2(b) positioned along its center axis. Swirling air passes through the annulus around the fuel injector promoting flame stability and attachment to the water-cooled quarl. For the research results presented here a high swirl (IFRF type 2) flame with internal recirculation (Swirl No.=1.48) was examined. Axial access ports permitted temperature measurement and injection of sorbents. Gaseous and aerosol samples were taken from a stack location 589.3 cm from the burner quarl. The temperature at this location was approximately 670 K (745° F.).

Figures 2A, 2B:
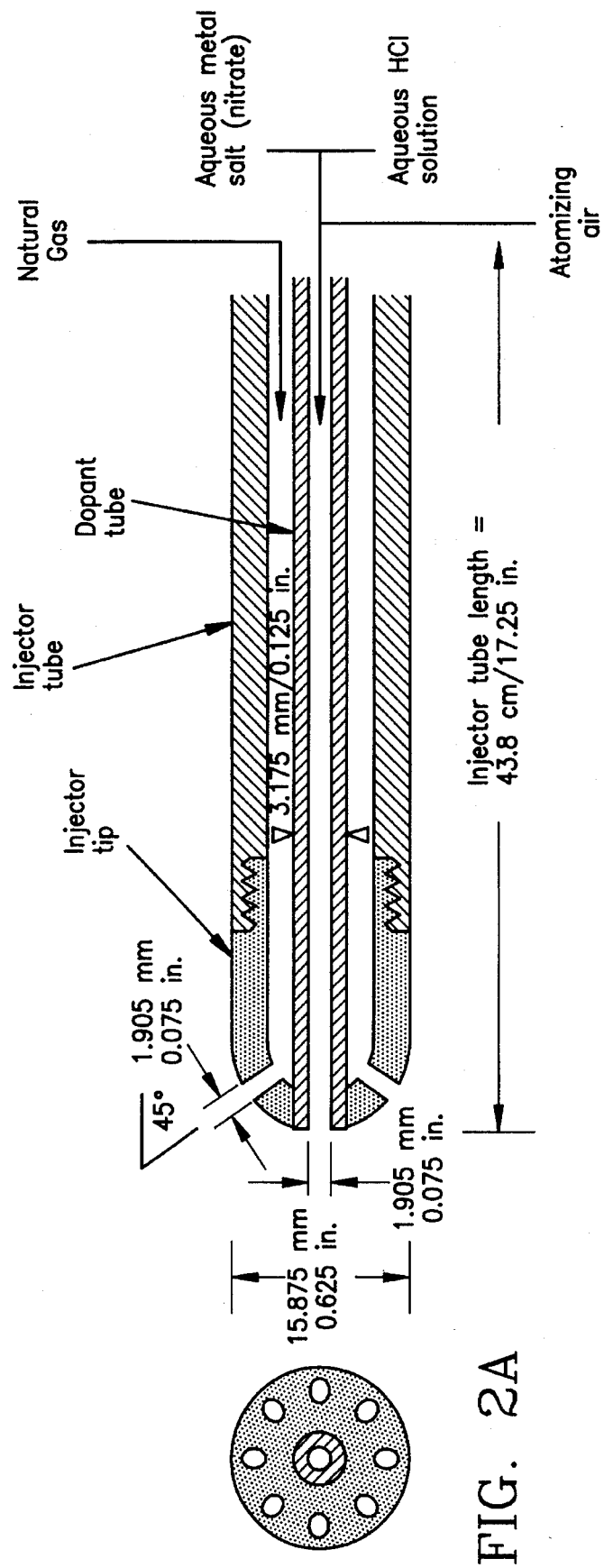

Metals were introduced as aqueous nitrate solutions through a special fuel/waste injector which incorporated a small air atomizing system down the center of a standard natural gas injector as shown in FIG. 2(b). The resulting droplet particle size distribution (PSD) was relatively narrow with a mean droplet size of approximately 50 μm diameter. Chlorine ($Cl_2$) was introduced, separately from the metal solutions, with the (secondary) combustion air. Powdered kaolinite, bauxite, or hydrated lime sorbents were introduced co-currently along the combustor centerline at a post flame location 76.2 cm from the burner quarl using a small screw feeder and air transport. Thus, the metal, chlorine, and sorbent were not mixed prior to their introduction into the combustor, and all interactions between these components were dependent upon normal mixing patterns.

Chemical composition samples and PSD measurements from the stack were taken using an Andersen Inc. eight stage, 28.3 L/min. (1 ft³/min.), atmospheric pressure cascade impactor and a TSI Inc. differential mobility particle sizer (DMPS). The impactor is designed to collect physical samples (available for subsequent gravimetric and/or chemical analysis) in nine (including the afterfilter) particle size ranges (0–0.4, 0.4–0.7, 0.7–1.1, 1.1–2.1, 2.1–3.3, 3.3–4.7, 4.7–5.8, 5.8–9.0, >9.0 μm). A preseparator was used to remove large sorbent particles. However, this material was included in the analysis of the >9.0 μm fraction. Impactor samples were examined for the metals of interest using inductively coupled plasma mass spectroscopy ICP/MS). Selected stages from replicate impactor samples were examined by scanning electron microscopy/x-ray dispersive spectroscopy (SEM/XDS), x-ray diffraction (XRD), and ion chromatography (IC) analyses. The DMPS classifies and counts particles within a working range of 0.01 to 1.0 μm diameter using principles of electrical mobility. The DMPS was configured to yield 27 channels evenly spaced (logarithmically) over this range.

The two-stage isokinetic aerosol sampling system was built based on the modified designs of Scotto. In order to minimize in-probe gas and aerosol kinetics, the sampling system dilutes and cools the aerosol sample using filtered nitrogen and air immediately after sampling. Calculated dilution ratios and sampling probe residence times are 15:1 and 0.2s, and 300:1 and 2.5s for the impactor and DMPS, respectively. Dilution ratios are measured directly and verified independently by the measurement of nitric oxide.

Metal/Sorbent Systems Investigated

Baseline experiments were performed injecting aqueous solutions of nickel [$Ni(NO_3)_2$], lead [$Pb(NO_3)_2$], and cadmium [$Cd(NO_3)_2$], with and without chlorine, into a 58.6 kW (200,000 Btu/hr) natural gas flame. Aqueous solutions containing 1.5% (by weight) metal were used. Solution flow rates were maintained so as to produce stack gas concentrations of approximately 100 ppm metal (by volume). Metal nitrate feed rates were 0.91, 1.73, and 1.19 g/min for the nickel, lead, and cadmium "wastes," respectively, and correspond to constant molar feed rates of 0.005 g-moles/min. Chlorine was added to maintain a 10:1 molar ratio of chlorine (as Cl) to metal, resulting in a chlorine stack concentration of approximately 1000 ppm (by volume). Excess air was maintained at 20%. No air preheat was employed. In contrast to previously reported research in which chlorine was introduced as an aqueous HCl solution through the same injector as the metal solution, chlorine in this set of experiments was introduced as $Cl_2$ gas with the combustion air. This procedural change, however, did not cause any noticeable change in the aerosol behavior and eliminated the severe injector corrosion problems previously encountered.

To complement the baseline experiments, kaolinite, bauxite, or hydrated lime sorbents were injected into the high temperature post flame. The measured temperature was approximate 1575 K (2375° F.). Sorbents were introduced at a rate of 3 g/min. As with the baseline experiments, sorbent testing was conducted with and without chlorine addition. Elemental analyses of the sorbents are as follows: kaolinite—19.0%, Si, 16.0% Al, 0.3% Fe, 1.0% Ti, <0.1% Ca; bauxite—3.0% Si, 35.1% Al, 1.1% Fe, 2.2% Ti, 0.1% Ca, <0.1% Mg; and hydrated lime—0.3% Si, 0.2% Al, 55.4% Ca, 0.1% Fe, 0.3% Mg. The kaolinite, bauxite, and hydrated lime sorbents used here had mass mean diameters and BET surface areas of 5.38, 10.79, and 2.24 μm, and 9.12, 0.69, and 22.8 m²/g, respectively. It should be noted that the trace quantities of nickel, lead, and cadmium introduced with the three sorbents were between 1000 and 10,000 times less than the quantities introduced as aqueous nitrates.

Nickel/Kaolinite/Chlorine System

Figure 3A:
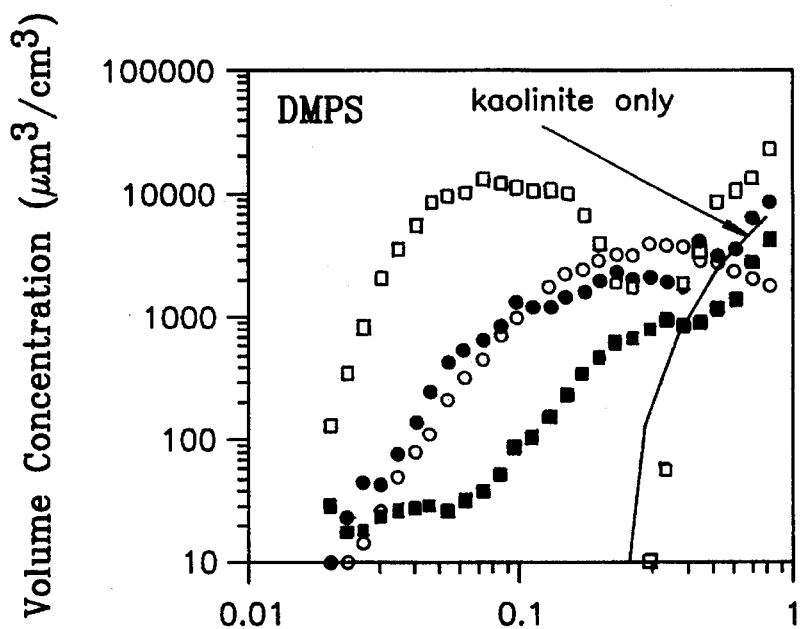
Figure 3B:
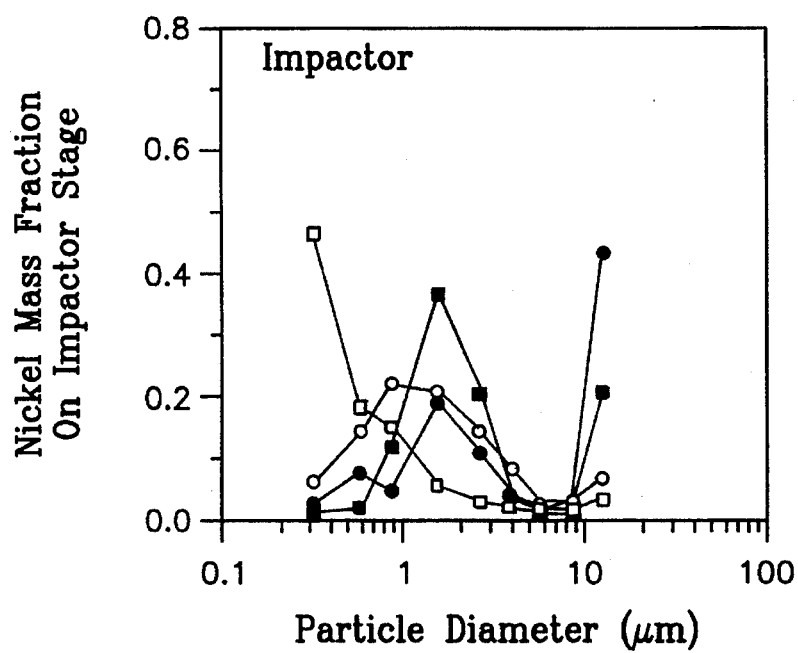

FIG. 3A presents DMPS volume and FIG. 3B presents impactor nickel mass distributions for the nickel experiments. Without kaolinite addition (open symbols), the baseline data indicate little evidence of a notable submicron mode, but clear indication of a supermicron mode with mean particle diameter ($d_p$) of between 1 and 2 μm. Based on PSD measurements of the aqueous metal spray, this aerosol diameter is consistent with the mechanism of one residual nickel particle per initial spray droplet and is not consistent with any substantial nickel vaporization/nucleation or fragmentation. The low volatility of nickel and of NiO at these temperatures supports these conclusions.

With the addition of chlorine, the nickel behavior is quite different. Impactor data (Table 1) indicate that almost 80% of the nickel resides on particles less than 1.1 μm, and the DMPS data indicate a distinct submicron mode with mean $d_p$ between 0.05 and 0.1 μm. Moreover, this behavior is indicative of a mechanism of nickel vaporization followed by subsequent nucleation, condensation, and coagulation. This change is likely due to the dramatic increase in nickel volatility due to the addition of chlorine, although current thermodynamic equilibrium calculations were unable to predict the presence of nickel chloride vapor species at the temperatures encountered here. It should be noted that, while FIGS. 3A and 3B and the figures which follow present individual representative DMPS and impactor distributions, the quantitative data presented in Table 1 represent averages of replicate experiments.

Without chlorine, the addition of kaolinite indicates little change in the nickel PSD compared to the baseline data. With the exception of channels near 1.0 μm, where the sorbent PSD begins to dominate, the DMPS distributions are essentially identical. However, this is not surprising, as it can be shown that the times necessary for coagulation/agglomeration of nickel and kaolinite are exceedingly large and any notable interaction is unlikely unless the nickel is first vaporized.

With chlorine present, the nickel/kaolinite/chlorine data, FIG. 3A and Table 1 reveal substantial reductions of submicron volume (92%) and nickel mass fraction (81%) compared to the nickel/chlorine data. It seems likely that, once vaporized, the nickel is able to interact with and be adsorbed by the kaolinite, although the mechanism of this interaction remains unclear and does not appear to involve formation of a surface melt. SEM/XDS analyses of particulate samples collected on impactor stage 3 (1.1–2.1 μm) showed that high concentrations of chlorine did not coincide with high concentrations of nickel, which was not uniformly distributed on all sorbent particles. Therefore, the adsorbed compound was not a nickel chloride compound. SEM observations did not support the mechanism of coagulation of a nickel chloride fume with the sorbent. These results were supported by IC analysis of an afterfilter sample (0–0.4 μm), which indicated an overall nickel/chlorine molar ratio of 0.1. X-ray diffraction analyses failed to indicate the presence of a crystalline nickel compound in the sorbent, much of which melted at combustor temperatures, both with and without metal present and probably because of associated impurities. Indeed, the nickel seemed to be associated with melted particles in which silicon was dominant. These observations suggest that, at combustion temperatures, chlorine causes nickel to vaporize creating conditions which allow the nickel vapor to incorporate with the sorbent melt, yet forming a product that does not contain the chlorine.

Lead/Kaolinite/Chlorine System

Figure 4A:
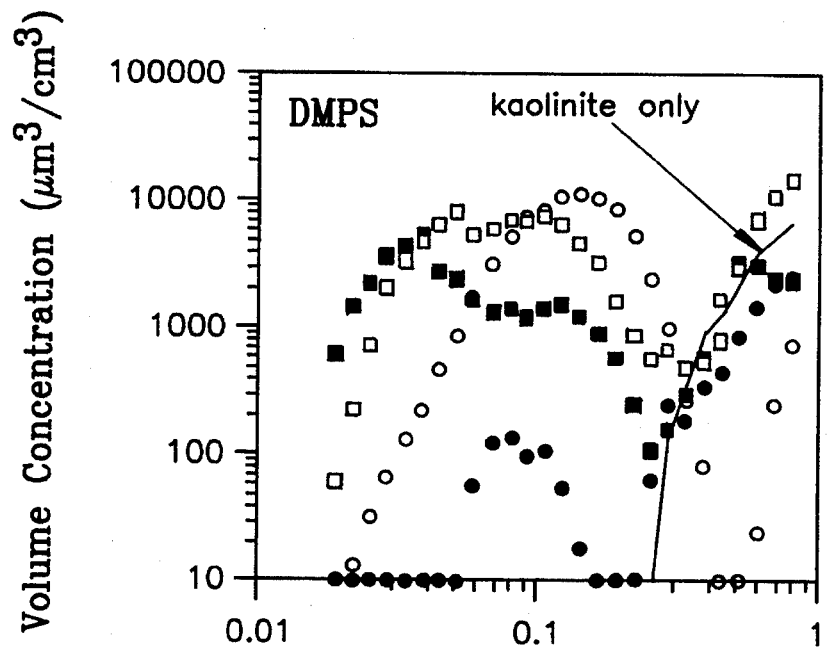
Figure 4B:
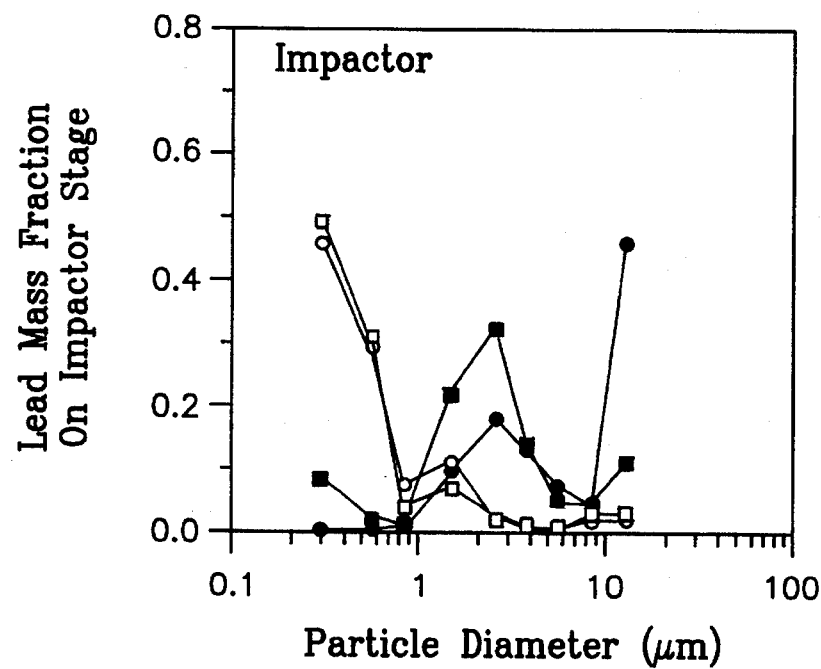

In contrast to nickel, the lead baseline data of FIGS. 4A and 4B without chlorine, indicate the presence of a distinct submicron mode with a mean $d_p$ between 0.1 and 0.2 μm. This behavior is consistent with lead vaporization followed by subsequent aerosol formation and growth and is consistent with the known volatilities of lead and lead oxide. With chlorine added, this mode is shifted towards even smaller $d_p$ (between 0.03 and 0.1 μm) possibly indicating delayed nucleation and a less mature aerosol at the sampling location. In fact, the impactor data (Table 1) indicate that between 80 and 82% of the measured lead is associated with particles less than 1.1 μm for these two data sets.

With the addition of kaolinite, both the DMPS and impactor data indicate substantial reductions in the submicron aerosol volume and lead mass fraction (72 and 98%, respectively) compared to the baseline (without chlorine) distributions. Similar reductions are also evident comparing the distributions with chlorine (49 and 86%). Morphological observations indicated that much of the kaolinite melted, both with and without lead present. These results are consistent with those of Scotto et al, where high uptakes of lead on sorbent particles were associated with formation of melts on sorbent surfaces.

Cadmium/Kaolinite/Chlorine System

Figure 5A:
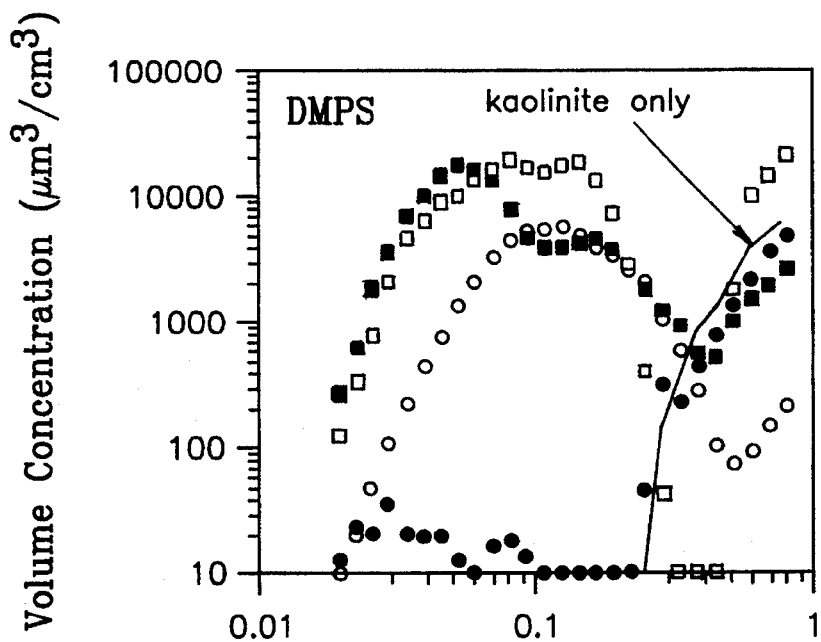
Figure 5B:
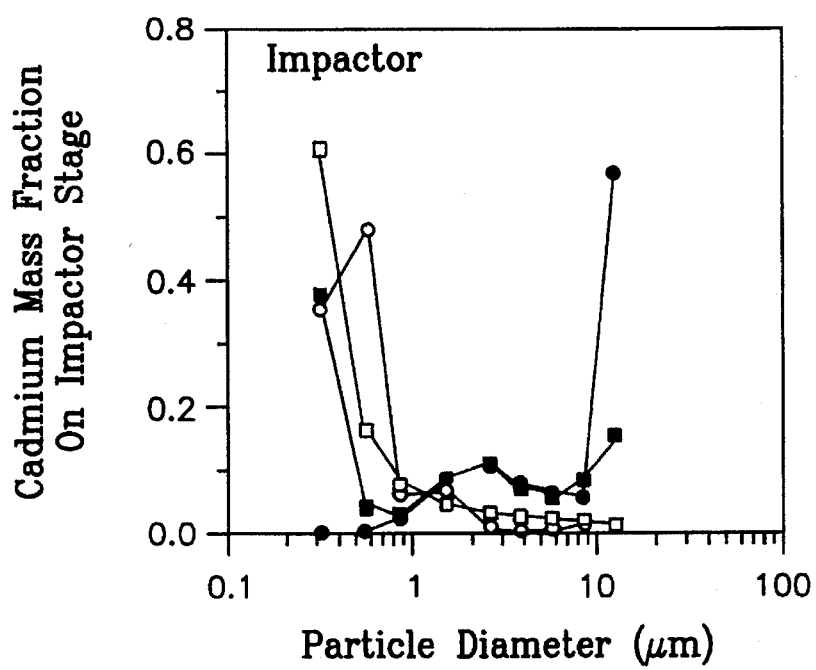

FIGS. 5A and 5B illustrate that the cadmium baseline and cadmium/chlorine data (without kaolinite) are similar to corresponding lead data presented above. Cadmium, CdO, and $CdCl_2$ vapor pressures are similar to those for lead, PbO, and $PbCl_2$, all of which are notably high at the peak temperatures seen in the combustor. As with the lead system, the cadmium behavior is indicative of particle formation via a vaporization mechanism. The impactor data shows that 88 and 85% of the cadmium mass are associated with particles less than 1.1 μm for the cadmium baseline and cadmium/chlorine experiments, respectively.

FIGS. 5A and 5B also show that the addition of kaolinite causes substantial decreases in both the DMPS submicron volume concentration (61%) and the <1.1 μm impactor cadmium mass fraction (97%).

It is interesting to note that almost uniformly, for all metals and sorbents examined, quantitative reductions measured due to sorbent addition are much larger for the impactor data compared to the DMPS data. However, this can be explained based on the operation of the two instruments. The impactor with subsequent ICP/MS analysis yields specific metal concentrations (or mass fractions). The DMPS, although producing greater resolution, is less specific, counting and sizing all particles (for subsequent conversion to volume concentrations). If the addition of sorbent contributes, even minimally, to increases in the submicron aerosol volume, then this added material is counted against any toxic metal removal. This can be seen in each of the DMPS plots where sorbent-only distributions are included for comparison. The sorbents each contribute minimally to the distributions for particle sizes less than approximately 0.2 to 0.3 μm. However, the sorbent contribution becomes important for particle sizes greater than 0.5 μm, adding to the submicron mass. Therefore, even though the impactor data lack resolution, they are likely more indicative of the toxic metal behavior.

These results differ from those of Uberoi and Shadman in two important respects: (1) the amount of cadmium removed here (97%) in a time scale of seconds, is far higher than the 5% removed by kaolinite in their bench scale studies, and (2) the sorbent particles that removed cadmium here were melted, with no observable (by XRD) cadmium related crystalline structure, while in the bench scale studies they remained crystalline. The melt appeared to avoid limitations of pore blockage by reaction products, as identified by Uberoi and Shadman.

Cadmium/Bauxite/Chlorine System

With the addition of bauxite, the DMPS distributions (cadmium baseline and cadmium/bauxite) illustrate almost quantitative removal of particles <0.2 µm (distributions not shown). The impactor data (Table 1) indicate that 97% of the cadmium originally associated with particles <1.1 µm in diameter was removed from that particle size range through the addition of bauxite. These results are in agreement with those of Uberoi and Shadman which suggest bauxite to be an exceptional sorbent for use with cadmium. Furthermore, in both this combustor study and in the previous bench scale studies, the sorbent particles remained unmelted and crystalline. Therefore, sorbents that do not melt can also be effective in reactively scavenging toxic metals, provided that pore blockage is not a factor.

Cadmium/Hydrated Lime/Chlorine System (an embodiment of the present invention)

As with the two sorbents tested above, hydrated lime acts as an effective agent to scavenge cadmium which would otherwise contribute to the submicron aerosol fraction (distributions not shown). However, these results are in contrast to those of Uberoi and Shadman and one would not have expected reactive scavenging to occur. It is interesting to note that hydrated lime seems to be particularly effective even in the presence of chlorine. The 99% reductions in both submicron volume (DMPS) and cadmium submicron mass fraction (impactor) with chlorine present (Table 1), represent the greatest measured removals seen for any chlorinated system examined. In the absence of cadmium, the lime sorbent particles were crystalline, angular, and had not melted. With the addition of cadmium, the calcium rich sorbent particles melted. Calcium oxide, which is basic, is known to form eutectic melts with acidic metal oxides.

Mechanism and Conclusions

The impactor data were examined to determine the existence of any metal particle size dependence. Such dependencies sometimes yield information to identify pertinent mechanisms. The cadmium/lime system (with and without chlorine) indicates no particle size dependence. The lead/kaolinite and cadmium/kaolinite systems (with and without chlorine) exhibited weak $d_p$ dependencies with some enrichment in small particles, and this conclusion is consistent with the observation of Scotto et al. The cadmium/bauxite system (with and without chlorine) produced the most notable $1/d_p$ dependence, indicating a pore diffusion or external surface reaction rate controlled process.

The effect of chlorine is to significantly increase the submicron volume concentrations and submicron metal mass fractions, in the absence of sorbents, and to diminish sorbent effectiveness when they are present (Table 1). This work uncovered a new mechanism that allows the scavenging of refractory metals like nickel. According to this mechanism, nickel can be volatilized by chlorine and then scavenged by kaolinite to remove 80–90% of the metal, which could not be removed in the absence of chlorine. The chlorine, in effect, acts as a carrier of the metal to the sorbent melt surface, where the metal was adsorbed and the chlorine released.

The results of this investigation suggest that toxic metal capture by fluxing agents is more practical for industrial incinerators than was initially suggested by bench scale thermogravimetric reactor studies and that fluxing agents which form melts on their surfaces in combination with captured metals are particularly effective.

TABLE 1

Changes in submicron volume concentration and submicron metal mass fraction with sorbent and chlorine addition.

| DMPS | Volume conc. $d_p < 1.0$ µm (µm$^3$/cm$^3$) | Volume conc. with chlorine $d_p < 1.0$ µm (µm$^3$/cm$^3$) | % change due to chlorine |
|---|---|---|---|
| Ni baseline | 4.02E+4 | 1.79E+5 | +345.3 |
| Ni/kaolinite | 5.21E+4 | 1.49E+4 | −71.4 |
| % change due to sorbent | +29.6 | −91.7 | |
| Pb baseline | 8.98E+4 | 1.08E+5 | +20.3 |
| Pb/kaolinite | 2.54E+4 | 5.46E+4 | +115.0 |
| % change due to sorbent | −71.7 | −49.4 | |
| Cd baseline | 4.79E+4 | 6.84E+5 | +1328.0 |
| Cd/kaolinite | 1.85E+4 | 2.14E+5 | +1056.8 |
| % change due to sorbent | −61.4 | −68.7 | |
| Cd/bauxite | 1.19E+4 | 1.66E+5 | +1295.0 |
| % change due to sorbent | −75.2 | −75.7 | |
| Cd/hyd lime | 1.66E+4 | 4.16E+3 | −74.9 |
| % change due to sorbent | −65.3 | −99.4 | |

| Impactor | Metal mass fraction $d_p < 1.1$ µm | Metal mass fraction with chlorine $d_p < 1.1$ µm | % change due to chlorine |
|---|---|---|---|
| Ni baseline | 0.471 | 0.791 | +67.9 |
| Ni/kaolinite | 0.155 | 0.150 | −3.2 |
| % change due to sorbent | −67.1 | −81.0 | |
| Pb baseline | 0.822 | 0.797 | −3.0 |
| Pb/kaolinite | 0.0170 | 0.111 | +552.9 |
| % change due to sorbent | −97.9 | −86.1 | |
| Cd baseline | 0.880 | 0.852 | −3.2 |
| Cd/kaolinite | 0.0296 | 0.445 | +1403.4 |
| % change due to sorbent | −96.6 | −47.8 | |
| Cd/bauxite | 0.0253 | 0.0652 | +157.7 |
| % change due to sorbent | −97.1 | −92.3 | |
| Cd/hyd lime | 0.0728 | 0.0075 | −89.7 |
| % change due to sorbent | −91.7 | −99.1 | |

The invention may be embodied in other specific forms without departing from its spirit or essential characteristics. The present embodiments are, therefore, to be considered in all respects as illustrative and not restrictive, the scope of the invention being further indicated by the claims rather than limited by the foregoing description, and all changes which come within the meaning and range of the equivalents of the claims are therefore intended to be embraced therein.

We claim:

1. A process for removal of vapor phase metals from a combustion gas, said process comprising:
   contacting the combustion gas with a particulate fluxing agent capable of forming a eutectic melt in combination with at least one of the vapor phase metals; and
   heating the particulate fluxing agent to a temperature sufficient to form a melt of a eutectic of said fluxing agent and at least one of the vapor phase metals, at least at surface portions of the fluxing agent particles, and to capture the vapor phase metals in the eutectic melt.

2. A process in accordance with claim 1, wherein said particulate fluxing agent is hydrated lime.

3. A process in accordance with claim 1, wherein said metal is at least one metal selected from the group consisting of nickel, lead, cadmium and mercury.

4. A process in accordance with claim 1, wherein said temperature is at least approximately 1000° K.

5. A process in accordance with claim 1, wherein said combustion gas contains significant amounts of chlorine.

6. A process in accordance with claims 5, wherein one of said vapor phase metals is nickel.

7. A process in accordance with claim 1, wherein said fluxing agent is dispersed in a combustion zone containing the combustion gas to form a gaseous suspension of the fluxing agent particles, thereby bringing the fluxing agent particles into contact with the vapor phase metals.

8. A process in accordance with claim 1, further comprising adding an additional metal to the eutectic melt to depress the melting point of the eutectic.

9. A process in accordance with claim 8, wherein said fluxing agent particles are dispersed in a combustion zone containing the combustion gas to form a gaseous suspension of the fluxing agent particles and to bring the fluxing agent particles into contact with the vapor phase metals; and wherein the additional metal or a compound thereof is introduced into the combustion zone in the form of a dispersion of initially solid particles.

10. A process in accordance with claim 9 wherein said additional metal is selected from the group consisting of alkali metals, alkaline earth metals, boron and iron.

11. A process in accordance with claim 1 wherein said temperature is at least approximately 1500° K.

12. A process in accordance with claim 1 wherein said temperature is at least approximately 1200° K.

13. A process for removal of vapor phase metals from a combustion gas, said process comprising:

dispersing a particulate fluxing agent in a combustion zone containing the combustion gas to form a gaseous suspension of the particulate fluxing agent and to bring said fluxing agent particles into contact with the vapor phase metals, said fluxing agent being at least one member selected from the group consisting of CaO, $Ca(OH)_2$ and calcium containing substances which are converted to CaO and/or $Ca(OH)_2$ in the combustion zone; and heating the fluxing agent particles in the gaseous suspension to a temperature sufficient to form a melt of a eutectic of said fluxing agent and at least one of the metals, at least at surface portions of the fluxing agent particles, and to capture the vapor phase metal in the eutectic melt.

14. A process in accordance with claim 13, wherein said temperature is at least approximately 1000° K.

15. A process in accordance with claim 13, wherein said combustion gas contains significant amounts of chlorine.

16. A process in accordance with claim 15, wherein one of said vapor phase metals is nickel.

17. A process in accordance with claim 13 wherein said temperature is at least approximately 1500° K.

18. A process in accordance with claim 13 wherein said temperature is at least approximately 1200° K.

* * * * *